United States Patent
Johnson et al.

(10) Patent No.: US 9,417,137 B2
(45) Date of Patent: Aug. 16, 2016

(54) LIQUID BASED ICE PROTECTION TEST SYSTEMS AND METHODS

(71) Applicant: Textron Innovations Inc., Providence, RI (US)

(72) Inventors: Vicki S. Johnson, Bel Aire, KS (US); Derek W. Rounds, Wichita, KS (US); Lawrence R. Nelson, Wichita, KS (US); Jeffrey G. Wyckoff, Wellington, KS (US); Robin L. Young, Wichita, KS (US)

(73) Assignee: Textron Innovations Inc., Providence, RI (US)

(*) Notice: Subject to any disclaimer, the term of this patent is extended or adjusted under 35 U.S.C. 154(b) by 474 days.

(21) Appl. No.: 13/964,837

(22) Filed: Aug. 12, 2013

(65) Prior Publication Data

US 2013/0327134 A1 Dec. 12, 2013

Related U.S. Application Data

(63) Continuation of application No. 12/552,122, filed on Sep. 1, 2009, now Pat. No. 8,506,160.

(60) Provisional application No. 61/112,505, filed on Nov. 7, 2008.

(51) Int. Cl.
*G01N 25/02* (2006.01)
*G01N 25/72* (2006.01)
*G01K 13/00* (2006.01)
*G01M 99/00* (2011.01)

(52) U.S. Cl.
CPC .............. *G01K 13/00* (2013.01); *G01M 99/002* (2013.01)

(58) Field of Classification Search
CPC ................................ G01N 25/02; G01N 25/72
USPC ........... 374/4, 5, 46, 147, 110–112, 115, 137, 374/185, 163; 73/116.01, 118.03
See application file for complete search history.

(56) References Cited

U.S. PATENT DOCUMENTS

| | | | |
|---|---|---|---|
| 3,669,811 A * | 6/1972 | Jarvis ................... | B64F 5/0009 156/475 |
| 4,801,113 A | 1/1989 | Engelhardt | |
| 5,134,248 A | 7/1992 | Kiec et al. | |
| 5,167,451 A * | 12/1992 | Muller ................ | G01M 99/002 374/45 |
| 5,282,682 A | 2/1994 | Orlando et al. | |
| 5,750,047 A | 5/1998 | Lemma | |
| 5,800,335 A * | 9/1998 | Koch ................... | A61B 5/0555 600/22 |
| 5,816,313 A * | 10/1998 | Baker .................. | F16K 15/048 137/519.5 |
| 6,422,744 B1 | 7/2002 | Galenkamp et al. | |
| 6,644,849 B1 | 11/2003 | Conner | |
| RE39,295 E | 9/2006 | Cronin et al. | |
| 7,301,452 B2 * | 11/2007 | Gerder ................ | A61B 5/0002 340/539.12 |
| 7,425,093 B2 | 9/2008 | Wickersham, Jr. et al. | |
| 7,909,507 B2 * | 3/2011 | Bunker ..................... | G01F 1/68 374/121 |
| 8,037,750 B2 | 10/2011 | Heuer et al. | |
| 9,164,050 B2 * | 10/2015 | Davies ................ | G01M 99/002 |
| 2006/0145020 A1 * | 7/2006 | Buehler .................. | B64G 1/58 244/171.8 |
| 2010/0078521 A1 | 4/2010 | De Smet | |
| 2013/0128914 A1 * | 5/2013 | Davies ................... | G01N 25/72 374/5 |

FOREIGN PATENT DOCUMENTS

KR 20080103124 A * 11/2008

OTHER PUBLICATIONS

Select File History from U.S. Appl. No. 12/522,122 dated Aug. 2, 2012 through Apr. 10, 2013, 30 pages.

* cited by examiner

*Primary Examiner* — Gail Kaplan Verbitsky
(74) *Attorney, Agent, or Firm* — Erise IP, P.A.

(57) ABSTRACT

A liquid based ice protection test system for testing an aircraft part having a first heating element comprises a tub configured for retaining a low temperature bath. The system also includes a first support member for suspending the aircraft part in the tub and a first temperature sensing device for sensing temperatures from one or more locations of a skin of the aircraft part.

19 Claims, 2 Drawing Sheets

LIQUID BASED ICE PROTECTION TEST SYSTEMS AND METHODS

CROSS-REFERENCE TO RELATED APPLICATIONS

This application is a continuation of U.S. patent application Ser. No. 12/552,122 filed Sep. 1, 2009, which claims priority to U.S. Provisional Patent Application No. 61/112,505 filed Nov. 7, 2008. The entire contents of each are incorporated herein by reference in their entirety.

BACKGROUND OF THE INVENTION

1. Field of the Invention

The disclosed embodiments relate to thermal testing systems. More specifically, the embodiments disclosed relate to processes of simulating icing conditions for the purpose of testing aircraft ice protection equipment.

2. Description of the Related Art

The ice protection equipment employed on many aircraft includes a number of heating elements deposited on an inside surface of an aircraft skin at a leading edge of a particular component, e.g., wings, horizontal tails, and other parts that are susceptible to icing. Many systems include, at the very front of the leading edge, a "parting strip" heating element, and immediately behind the parting strip, what are referred to as "shed zone" heating elements. An upper shed zone element may be located on a top surface of the leading edge slightly back from the parting strip, and a lower shed zone element may be located below and slightly back of the parting strip. Before releasing such parts for use on an aircraft, it is critical for safety and other reasons that the heating elements are tested to ensure the equipment meets the desired performance requirements and that device failure is minimized.

One defect encountered in the manufacture of aircraft wings and other similar parts can exist in what is referred to as "matting" that may be used to secure heating elements to an inside surface of the skin at the leading edge. The matting is highly thermally conductive such that it promotes heat transmission from the heating element to the aircraft skin. Problems are encountered, however, when air bubbles exist in the matting between the heating element and the aircraft skin. As is noted in the art, air is highly resistant to heat transfer, and therefore air pockets in the matting can impair heat transmission from the heating element(s), and thus can promote unacceptable ice build up at the leading edge.

The manufacturer often tests the parts in what is referred to as an "icing tunnel"—a wind tunnel that simulates icing conditions as would exist in nature. An icing tunnel typically provides forced air that is highly saturated with supercooled water droplets at a full range of temperatures below freezing. Whether the ice is effectively eliminated can be, in some instances, visualized on the part during testing, or detected in other ways such as using sophisticated measurement equipment.

Icing tunnel testing will quickly show any deficiencies in heat transmission to the leading edge skin through a combination of visual observation and instrumentation. Defects in the heater installation can result in deficiencies in heat transmission to the leading edge skin with resulting unacceptable ice protection performance.

Using icing tunnels for testing purposes with defective parts, however, can be extremely expensive. Further, this expense is exacerbated considering that a single part may require three to four tests in the icing tunnel before it is successfully cleared.

SUMMARY

Systems and methods for testing ice protection subsystems are disclosed herein. According to an embodiment, a liquid based ice protection test system for testing an aircraft part having a first heating element comprises a tub configured for retaining a low temperature bath. The system also includes a first support member for suspending the aircraft part in the tub and a first temperature sensing device for sensing temperatures from one or more locations of a skin of the aircraft part.

According to another embodiment, a system for testing an ice protection subsystem of an aircraft part having at least one heating element comprises a tub for retaining a low temperature bath. The system further comprises a temperature sensing device for sensing temperatures from one or more locations of a skin of the aircraft part while the aircraft part is suspended in the tub, and an agitation mechanism.

According to yet another embodiment, an ice protection test system for testing a part having a first heating element comprises a tub for retaining a low temperature bath and a first temperature sensing device for sensing temperatures from one or more locations of the part. The system also includes a motorized agitation mechanism for agitating the bath.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The embodiments disclosed herein provide systems and a method for testing ice protection systems that use heating devices, e.g., heating elements. For example, in one embodiment liquid based ice protection test system is disclosed which simulates maximum heat transfer close to −30° C. in an icing tunnel. Depending on the aircraft operational envelope, the icing tunnel may be used to simulate the most stringent requirements for certification. The process can be used to detect, for example, defective heating elements and/or bonding defects between the heating elements and an aircraft skin.

Figure 1:
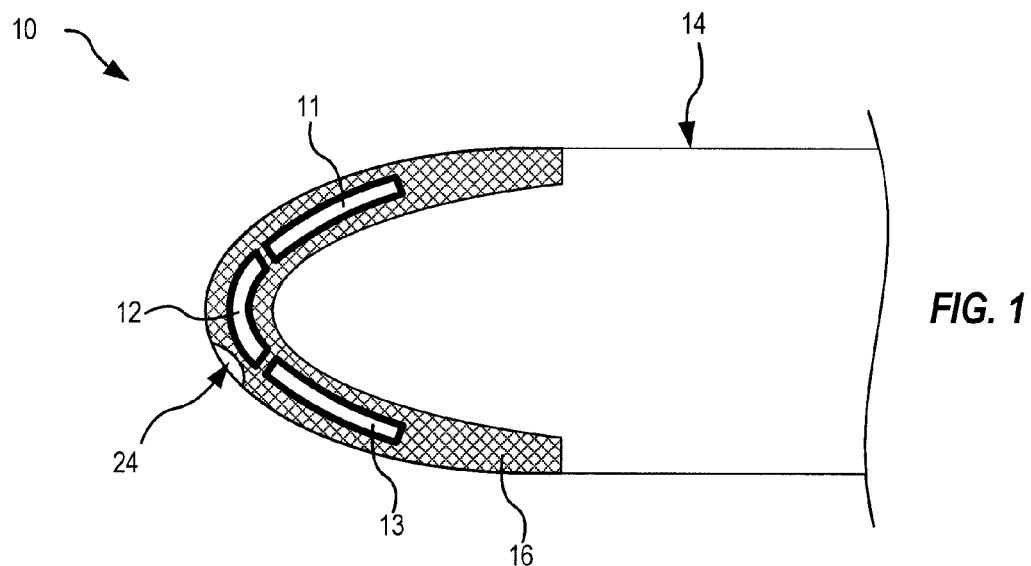
FIG. 1 is a cross-sectional view of a wing leading edge and structures therein.

Certain embodiments herein relate to testing wing and other similar parts leading edge ice protection structures. A typical leading edge ice protection arrangement can be seen in the aircraft part shown being tested in FIGS. 1 and 2. Referring to FIG. 1, which is a cross sectional view of a leading edge section 10, it can be seen that leading edge section 10 includes an upper shed zone heating element 11, a parting strip 12, and a lower shed zone heating element 13. Heating elements 11, 12 and 13 are disposed within a skin 14 of leading edge 10, and may be electrically powered in flight to heat up leading edge 10 to prevent ice from building up on the wing, to cause ice to shed, or both. Each of heating elements 11, 12 and 13 is bonded with skin 14 using matting 16. As is known to those skilled in the art, matting 16 provides dielectric insulation between each of heating elements 11, 12 and 13 and skin 14. One material that can be used to form matting 16 is silicone; however it is appreciated that other dielectric insulative materials could be used instead.

Embodiments herein are useful for, e.g., detecting defects in bonding of heating elements to an aircraft skin. One problem in manufacturing and/or product development of leading edge ice protection systems is that manufacturing defects can occur in matting 16, or in bonding matting 16 with heating elements 11, 12 and 13 and with skin 14. Such defects may especially occur between parting strip 12 and a most curved surface of leading edge section 10. One common defect is the development of air gaps, e.g., air gap 24 shown in FIG. 1. Air gap 24 interferes with heat transfer capabilities of heating element 12 (because it locally insulates skin 14 from heating element 12), which may lead to a hazardous inability to protect leading edge section 10 from unacceptable ice buildup, if not detected before section 10 is put in service.

Historically, various test technicques such as infrared imaging, cold environmental chambers, resistance measurements, and so forth have been used to test for defects in the heating systems, (e.g., defects in matting, air gaps, and the like). Air gaps and other bonding defects may occur at locations that are not readily visible to a manufacturer. The final and decisive test is conventional thermal testing performed in an icing tunnel to simulate the worst case scenario a wing would encounter in service. The part must be subjected to these worst-case-scenario conditions (e.g., −30° C. at sustained exposure) in order to obtain the necessary certifications.

Utilizing an icing tunnel, however, is extremely expensive and time consuming. For example, a single test can cost in excess of $50,000 and take a week to complete. Significant logistical dilemmas must also be overcome to arrange such a test. Further, it is often necessary to make multiple trips to the icing tunnel as defects are encountered. This is because there, as to now, has been no cost-effective way to simulate the heat transfer conditions experienced in the icing tunnel. So a tester may unknowingly bring a defective part to the tunnel, wasting valuable resources and time.

Figure 2:
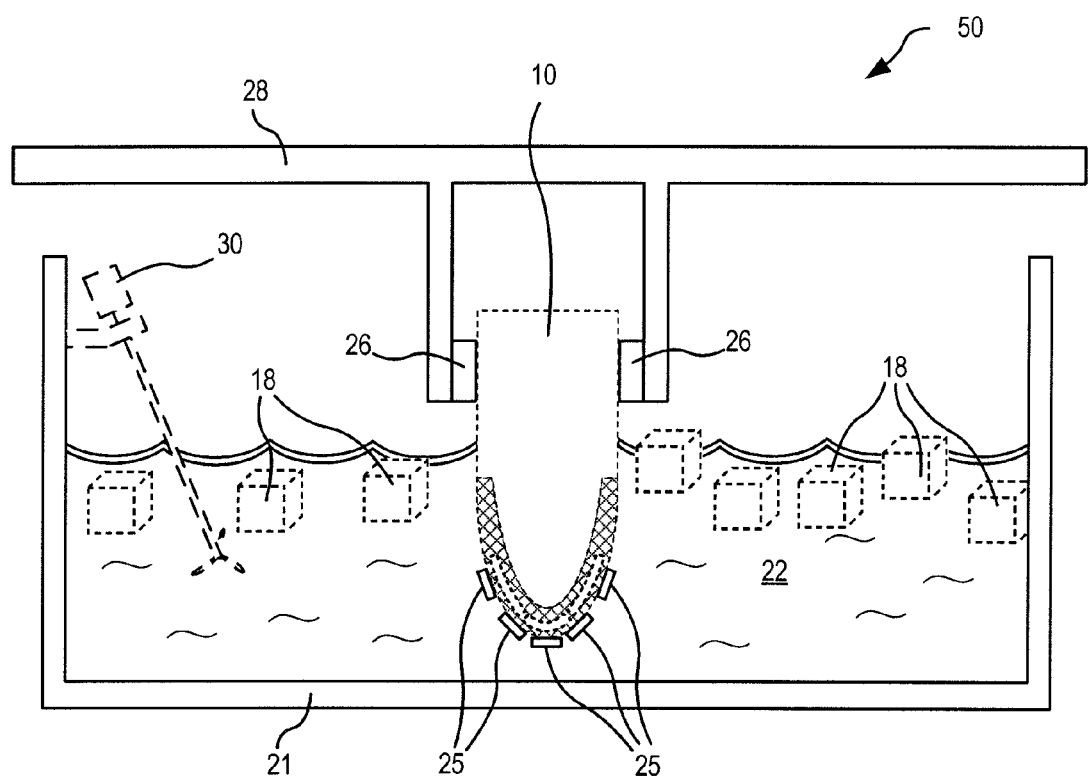
FIG. 2 is a cross-sectional view of the wing leading edge of FIG. 1 being tested in one embodiment of a liquid based ice protection test system.

The systems and methods disclosed herein allow for rapid and inexpensive screening of test articles that may otherwise have required repeated icing tunnel testing. An embodiment of an liquid based ice protection test system used in executing these methods is illustrated in FIGS. 1 and 2. The part being tested in these figures is a leading edge section 10. It is important to recognize, however, that numerous other applications for this testing system and associated methods exist. For example, the process could be used to simulate other ice protection conditions. These tests could also be used to test other parts which include heating elements that are secured inside aircraft surfaces (e.g., skins) for ice protection purposes. These tests could also be used to test temperature distributions of aircraft parts that are heated by alternate means such as, for example, bleed air.

Figure 3:
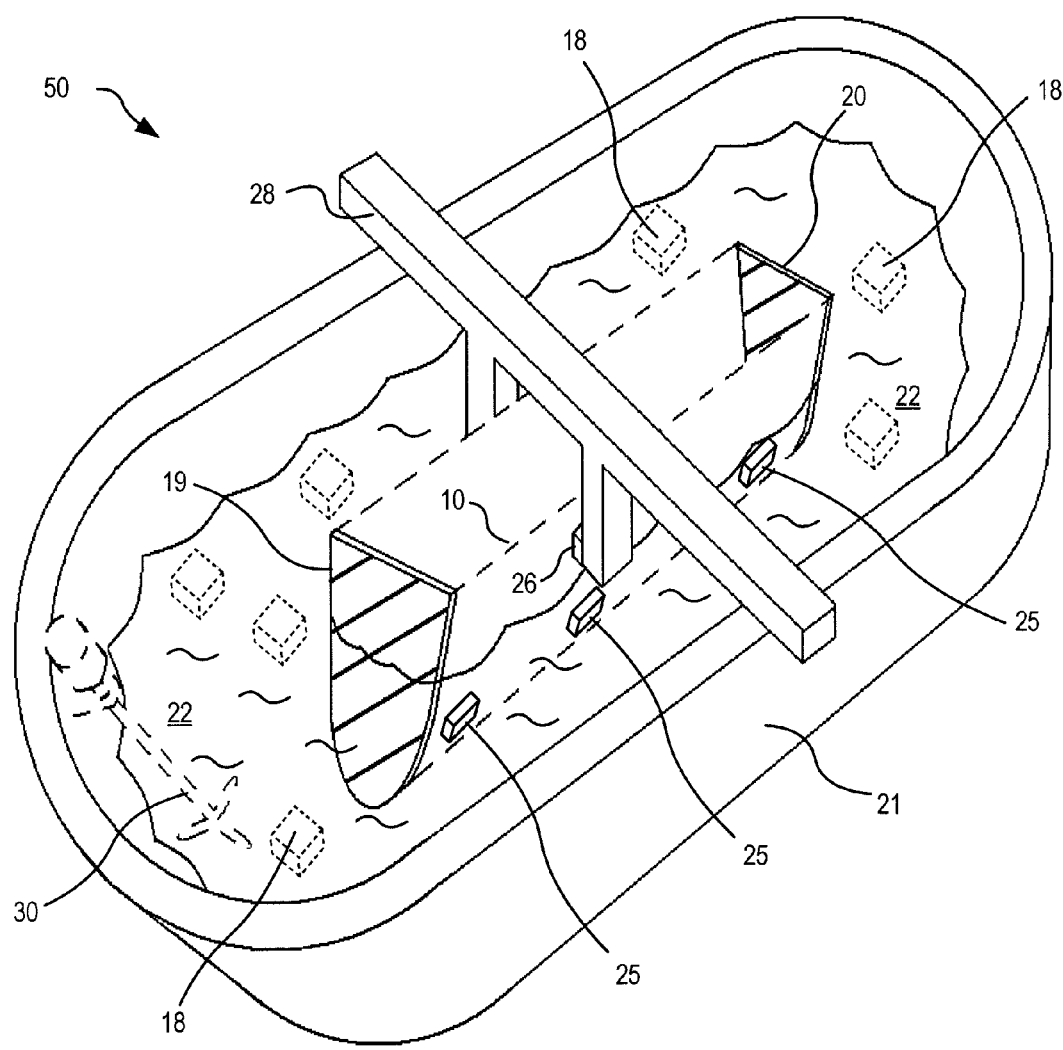
FIG. 3 is a perspective view of the liquid based ice protection test system of FIG. 2.

A liquid based ice protection test system 50 in assembled form is shown in FIGS. 2 and 3. Leading edge section 10 shown in FIGS. 2 and 3 is suspended into a low temperature bath that may include, for example, a liquid 22 and ice 18, in a tub 21. An agitation system 30 is be desirable for stirring the low temperature bath. Agitation system 30 is shown as a motorized shaft and paddle, but could be arranged in some other form such as a forced circulation system or a magnetic stirring system. Agitation system 30 ensures thorough mixing such that the part being tested is continuously presented with a uniformly cold solution during the test period, so that steady data is taken in the low temperature bath, even if the part being tested dissipates heat (e.g., from heating elements 11, 12 and/or 13). Ice 18 in the liquid 22 also absorbs dissipated heat (e.g., from heating elements 11, 12, and/or 13) such that the part being tested is continuously presented with a uniformly cold solution during the test period, so that steady data is taken in the low temperature bath.

As can be seen in FIG. 3, a forward end panel 19 and a rear end panel 20 seal respective ends of skin 14 of leading edge section 10. End panels 19 and 20 keep liquid out of the interior regions of leading edge section 10, and thus protect internal electrical features thereof.

System 50 also includes a suspension subsystem that supports a part being tested. For example, in FIG. 2 and FIG. 3, leading edge section 10 is suspended into the bath using opposing lateral supports 26 that are supported by a cross member 28. Cross member 28 extends across the low temperature bath and may rest at each end on an upper rim surface of tub 21, as shown in FIG. 2. Although only one member 28 is shown in the embodiment shown in FIG. 2, additional cross members may be provided for leading edge section 10 (or other part being tested) for improved mechanical stability. Also, although two lateral supports 26 are shown, it is understood that a part being tested may be supported by only one, or more than two, supports.

As shown in FIG. 2 and FIG. 3, lateral supports 26 are secured to cross member 28, for example by welding, fasteners, or other known securing techniques. Cross member 28, in embodiments, may simply rest on a rim of tub 21 during testing of the part, but could alternatively be removably secured with an upper part of tub 21 using fasteners of some other means, or could be suspended over tub 21 with a hoist. Lateral supports 26 are attached to the outside of part 10, e.g., using fasteners, clamps, or some other known attachment means.

In operation, the part to be tested (e.g., leading edge section 10), lateral supports 26, and cross member 28 may be prepared for testing outside of the low temperature bath. This may include attaching appropriate temperature sensing devices or other testing equipment. For example, Resistance Temperature Detectors ("RTDs"), which are temperature sensing devices that exploit a predictable change in electrical resistance due to temperature change, may be used. The temperature sensing devices may be affixed to a part being tested prior to immersion. For example, FIG. 2 and FIG. 3 show temperature sensing devices 25 affixed to skin 14 of leading edge section 10 at intervals over skin 14 corresponding to each of heating elements 11, 12 and 13; locations between heating elements would also be suitable places to locate sensing devices 25. This enables temperature readings to be taken at a variety of locations on the leading edge that will help determine whether defects (e.g., the air gaps at location 24) exist or not. Although RTDs are discussed herein, it is contemplated that other devices or methods may be utilized to measure temperature of a part being tested. It should be evident that spatial detail of temperature measurements across the part may be increased in correspondence with a number of temperature sensing devices deployed on the part, and that apparatus and/or methods of measuring temperature at a distance may be employed. Additionally, the heating elements 11, 12 and 13 may be electrically connected to one or more respective driver circuits so that they can be activated for the test.

The liquid bath must also be prepared before the test. This may involve, for example, placing ice 18 and liquid 22 in tub 21. In an embodiment, ice 18 is first added to tub 21 until the tub is partially full, then liquid 22 is added to raise the ice/liquid mixture to a desired level. If extensive testing is conducted, liquid 22 may need to be removed and more ice 18 added. Motorized agitating system 30 may be activated to circulate the liquid so that a part being tested will continue to be presented with uniformly cold liquid while heat dissipates from one or more surfaces of the part. Although an ice and water bath is described in particular detail herein, it is contemplated that other liquids and/or solids may be utilized in certain embodiments.

After the low temperature bath is prepared, a part to be tested (e.g., leading edge section 10) is inserted into the tub 21 in "boat" fashion, as shown in FIGS. 1 and 2, such that it is suspended below cross member 28 which may for example rest at each end on rim portions on opposite sides of tub 21. Once so positioned, the part is ready for testing.

To execute the test, heating elements may be activated individually or simultaneously, and readings may be taken from temperature sensing devices 25 located outside the leading edge skin 14.

After the testing is complete, the section 10 is simply lifted out of the tub, and set aside. Liquid 22 and/or ice 18 may be simply poured out or may be reused in an additional test.

Use of the liquid based ice protection test system and methods herein may prevent taking underperforming parts (e.g., having certain defects such as air gaps) to an icing tunnel unnecessarily. Icing tunnel testing may still be utilized to obtain certifications, but unnecessary trips to the tunnel with underperforming parts may be avoided.

Many different arrangements of the various components depicted, as well as components not shown, are possible without departing from the spirit and scope of the present invention. Embodiments of the present invention have been described with the intent to be illustrative rather than restrictive. Alternative or equivalent embodiments will become apparent to those skilled in the art that do not depart from its scope. A skilled artisan may develop alternative or equivalent means of implementing the aforementioned improvements without departing from the scope of the present invention.

It will be understood that certain features and subcombinations are of utility and may be employed without reference to other features and subcombinations and are contemplated within the scope of the claims. Not all steps need be carried out in the specific order described.

The invention claimed is:

1. A liquid based ice protection test system for testing an aircraft part having a first heating element, the system comprising:
   a tub configured for retaining a low temperature bath;
   a first support member for suspending the aircraft part in the tub; and
   a first temperature sensing device for sensing temperatures from one or more locations of a skin of the aircraft part.

2. The liquid based ice protection test system of claim 1 further comprising an agitation system for agitating the bath.

3. The liquid based ice protection test system of claim 2 wherein the agitation system comprises a shaft and a paddle.

4. The liquid based ice protection test system of claim 2 wherein the agitation system is motorized.

5. The liquid based ice protection test system of claim 1, further comprising a second support member, and wherein:
   the first support member is a lateral support member configured to be secured to an outside of the aircraft part; and
   the second support member is a cross member configured to extend across the tub and rest on an upper surface of the tub.

6. The liquid based ice protection test system of claim 5 wherein the first temperature sensing device is a resistance temperature detector.

7. The liquid based ice protection test system of claim 6 wherein the bath comprises ice and water.

8. A system for testing an ice protection subsystem of an aircraft part, the ice protection subsystem comprising at least one heating element, the system comprising:
   a tub for retaining a low temperature bath;
   a temperature sensing device for sensing temperatures from one or more locations of a skin of the aircraft part while the aircraft part is suspended in the tub; and
   an agitation mechanism for agitating the bath.

9. The system of claim 8 wherein the agitation mechanism is motorized.

10. The system of claim 8, wherein the agitation mechanism comprises a shaft and a paddle.

11. The system of claim 10 wherein the bath comprises ice and water.

12. The system of claim 11 wherein the temperature sensing device is a resistance temperature detector.

13. The system of claim 12 further comprising a first support member for suspending the aircraft part in the tub.

14. An ice protection test system for testing a part having a first heating element, the system comprising:
   a tub for retaining a low temperature bath;
   a first temperature sensing device for sensing temperatures from a first set of one or more locations of a skin the part while the aircraft part is suspended in the tub; and
   a motorized agitation mechanism for agitating the bath.

15. The system of claim 14, wherein the part is an aircraft part.

16. The system of claim 15 wherein the first temperature sensing device is a resistance temperature detector.

17. The system of claim 14 further comprising:
   a cross member configured to extend across the tub and rest on an upper surface of the tub; and
   a lateral support member configured to be secured to an outside of the aircraft part.

18. The system of claim 14 further comprising a second temperature sensing device for sensing temperatures from a second set of one or more locations of the skin the part; and a third temperature sensing device for sensing temperatures from a third set of one or more locations of the skin the part; and wherein the aircraft part comprises a second heating element and a third heating element.

19. The system of claim 18 wherein:
   the bath comprises ice and water; and
   the first, second, and third heating elements are each individually activated after the aircraft part is suspended in the tub.

* * * * *